United States Patent [19]

Traenckner et al.

[11] 4,081,492

[45] Mar. 28, 1978

[54] HARDENABLE COATING COMPOSITIONS

[75] Inventors: Hans-Joachim Traenckner; Karl Fuhr; Hans Jürgen Rosenkranz, all of Krefeld, Germany; Manfred Patheiger, deceased, late of Krefeld, Germany, by Hannelore Patheiger, heir; Hans Rudolph, Krefeld, Germany

[73] Assignee: Bayer Aktiengesellschaft, Leverkusen, Germany

[21] Appl. No.: 707,875

[22] Filed: Jul. 22, 1976

[30] Foreign Application Priority Data

Jul. 30, 1975 Germany .............................. 2534012

[51] Int. Cl.$^2$ .............................................. C08L 63/00
[52] U.S. Cl. ........................... 260/837 R; 204/159.15; 204/159.23; 260/836
[58] Field of Search ................................ 260/836, 837

[56] References Cited

U.S. PATENT DOCUMENTS

| 3,256,226 | 6/1966 | Fekete | 260/837 R |
| 3,971,834 | 7/1976 | Uzelmeier | 260/837 R |

Primary Examiner—Paul Lieberman

Attorney, Agent, or Firm—Connolly and Hutz

[57] ABSTRACT

A coating composition comprising as binder a reaction product of a polyepoxide with more than one 1,2-epoxide group per molecule, wherein its epoxide groups have been reacted a. with 0.01 to 0.5 NH-equivalents, based on one epoxide equivalent, of ammonia or of an aliphatic or cycloaliphatic primary or secondary amine or of an amino carboxylic acid or of a mixture of the aforementioned nitrogen compounds; and subsequently b. with 0.40 to 0.90 carboxyl equivalents, based on one epoxide equivalent, of acrylic acid or methacrylic acid or of a mixture of acrylic amd methacrylic acid; and finally c. with 0.09 to 0.50 carboxyl equivalents, based on one epoxide group, of a saturated aliphatic, a cycloaliphatic or an aromatic carboxylic acid, so that at least 80% of the epoxide groups originally present have been reacted through these three component stages. The binder may be used alone or together with additional monomers by radicals forming compounds or preferably by photopolymerization in the presence of a photoinitiator.

2 Claims, No Drawings

HARDENABLE COATING COMPOSITIONS

This invention relates to new nitrogen-containing unsaturated resins of polyepoxides, compounds containing aminohydrogen, (meth)acrylic acid and at least one aliphatic saturated, cycloaliphatic or aromatic monocarboxylic or dicarboxylic acid, which may be used as such or in combination with polymerisable monomers and/or optionally following the introduction of additives as coating compositions which dry in air or at elevated temperatures or under irradiation.

The reaction of glycidyl ethers of bisphenol A with acrylic acid leads to resin-like products which, by virtue of their content of vinyl groups, are capable of crosslinking by radical polymerisation. Systems such as these are described, for example, in British Patent Specification No. 1,006,587 or in U.S. Pat. No. 3,317,465. Solutions of these reaction products in vinyl monomers, such as acrylic or methacrylic acid esters, or even styrene are used as cast resins which are characterised in particular by their high resistance to hydrolysis.

Like solutions of unsaturated polyester resins in styrene, these products are hardened by the addition of organic peroxides and, optionally, accelerators, for example, cobalt salts.

It is also known that reaction products of epoxy resins and acrylic acid, dissolved in acrylic acid esters, can be provided with a photoinitiator and hardened by the action of UV-light. Products of this type are used as special dental filling compositions, as described in German Offenlegungsschrift No. 2,126,419.

However, attempts to use systems of this type as UV-light-hardening coating compositions in thin layers have shown that their crosslinking velocity is too low for practical application, especially in the presence of air. In general, thin layers of these compositions retain a very tacky surface. It is only when resins of this type are mixed with polyfunctional comonomers, for example with polyacrylic acid esters of polyhydric alcohols, to form UV-light-hardening coating materials that they show a reactivity which suppresses the inhibiting effect of air, providing their viscosity is of the order of a few hundred poises.

A further increase in reactivity can be obtained by the addition of tertiary amines. This further increase in reactivity provides for wide application as binders for UV-light-hardening printing inks and as paper lacquers (cf. DT-OS 2,349,979).

The UV-light-hardening coating materials according to DT-OS 2,349,979 are superior in their reactivity to the monomer-free unsaturated polyesters known from DT-OS 2,221,335 which can be hardened by UV-light in thin layers of up to 50 μ in the presence of photoinitiators. However, they are attended by the disadvantage that, if the epoxide function does not react completely with acrylic acid, the resins obtained do not remain stable in regard to viscosity in the event of storage. In the event of complete reaction, however, the hardened films are too brittle on account of the high degree of crosslinking.

Accordingly, the object of the present invention was to develop a highly reactive resin (binder) for coatings hardenable by UV-light or by other forms of radiation which, despite optimum reactivity, does not undergo any increase in viscosity when stored and, after hardening, shows good lacquer-grade properties. To this end, the known systems of reaction products of polyepoxides and (meth)acrylic acid had to be modified in such a way that, even when applied in the form of thin layers, they could be hardened by UV-light or other high-energy radiation, such as electron beams, in the presence of photoinitiators as quickly as or, if possible, even more quickly than conventional unsaturated polyesters. The use of other copolymerisable monomers with the binder had to be possible as and where necessary. Finally, the new systems had to be hardenable in the presence of radical donors either at room temperature or at elevated temperature without any need for UV-light or other high-energy radiation, such as electron beams.

According to the invention, this object is achieved by reacting polyepoxides initially with compounds containing aminohydrogen, subsequently with (meth)acrylic acid and finally with an aliphatic, cycloaliphatic or aromatic carboxylic acid, in such ratios that at least 80% and preferably at least 90% of the epoxide groups originally present are reacted.

Accordingly, the invention provides coating compositions comprising as binder a reaction product of a polyepoxide with more than one 1,2-epoxide group per molecule, characterised by the fact that its epoxide groups have been reacted a. with 0.01 to 0.5 NH-equivalents, based on one epoxide equivalent, of ammonia or of an aliphatic or cycloaliphatic primary or secondary amine or of an aminocarboxylic acid or of a mixture of the aforementioned nitrogen compounds; and subsequently b. with 0.40 to 0.90 carboxyl equivalents, based on one epoxide equivalent, of acrylic or methacrylic acid or of a mixture of acrylic and methacrylic acid; and finally c. with 0.09 to 0.50 carboxyl equivalents, based on one epoxide group, of a saturated aliphatic, a cycloaliphatic or an aromatic carboxylic acid, so that at least 80% of the epoxide groups originally present in the polyepoxide are reacted through these three stages.

Preferably, one epoxide equivalent of the starting polyepoxide has been reacted with 0.01 to 0.30 NH-equivalents of the components mentioned in a), subsequently with 0.40 to 0.60 carboxyl equivalents of the component mentioned in b) and finally with 0.10 to 0.50 carboxyl equivalents of the components mentioned in c), at least 90% of the epoxide groups originally present in the polyepoxide having been reacted.

The present invention also provides a process for producing binders for use in the coating compositions, i.e., the reaction products of at least one polyepoxide with more than one 1,2-epoxide group per molecule and compounds containing aminohydrogen and carboxyl groups, which comprises reacting a polyepoxide a. with 0.01 to 0.5 NH-equivalents, based on one epoxide equivalent, of ammonia or of an aliphatic or cycloaliphatic primary or secondary amine or of an aminocarboxylic acid or of a mixture of the aforementioned nitrogen compounds; and subsequently b. with 0.40 to 0.90 carboxyl equivalents, based on one epoxide equivalent, of acrylic or methacrylic acid or of a mixture of acrylic and methacrylic acid; and finally c. with 0.09 to 0.50 carboxyl equivalents, based on one epoxide group, of a saturated aliphatic, a cycloaliphatic or an aromatic carboxylic acid, so that at least 80% of the epoxide groups originally present in the polyepoxide are reacted through these three stages.

Preferably, from 0.01 to 0.30 NH-equivalents of the components mentioned in a), from 0.40 to 0.60 carboxyl equivalents of the components mentioned in b) and from 0.10 to 0.5 carboxyl equivalents of the components mentioned in c) are reacted per epoxide equivalent of the starting polyepoxide, so that at least 90% of the epoxide groups originally present in the polyepoxide are reacted.

In the context of the invention, polyepoxides are compounds which contain more than one 1,2-epoxide group (preferably 2.3 epoxypropyl groups) per molecule, preferably 1.6 to 6 and more especially 1.6 to 3 epoxide groups. One epoxide equivalent is the quantity of an epoxide in grams which contains one 1,2-epoxide group.

The polyepoxide compounds used may be polyglycidyl ethers of polyhydric phenols, for example of pyrocatechol, resorcinol, hydroquinone, of 4,4'-dihydroxy diphenyl methane, of 4,4'-dihydroxy-3,3'-dimethyl diphenyl methane, of 4,4'-dihydroxy diphenyl dimethyl methane(bisphenol A), of 4,4'-dihydroxy diphenyl methyl methane, of 4,4'-dihydroxy diphenyl cyclohexane, of 4,4'-dihydroxy-3,3'-dimethyl diphenyl propane, of 4,4'-dihydroxy diphenyl, of 4,4'-dihydroxy diphenyl sulphone, of tris-(4-hydroxy phenyl)-methane, of the chlorination and bromination products of the aforementioned diphenols, more especially of bisphenol A; of novolaks (i.e., of reaction products of monohydric or polyhydric phenols with aldehydes, more especially formaldehyde, in the presence of acid catalysts); of diphenols which have been obtained by esterifying 2 mols of the sodium salt of an aromatic hydroxy carboxylic acid with 1 mol of dihalogen alkane or dihalogen dialkyl ether or by esterifying 2 mols of an aromatic hydroxy carboxylic acid with 1 mol of a polyalkylene ether, such as tetraethylene glycol (cf. British Patent Specification No. 1,017,612); of polyphenols which have been obtained by condensing phenols and long-chain halogen paraffins containing at least two halogen atoms (cf. British Patent Specification No. 1,024,288).

Other suitable polyepoxide compounds are the glycidyl ethers of polyhydric alcohols, for example of 1,2-propane diol, 1,4-butane diol, 1,4-butene diol, 1,6-hexane diol, neopentyl glycol, glycerol, trimethylol propane, pentaerythritol and polyethylene glycols. Triglycidyl isocyanurate, N,N'-diepoxy propyl oxamide, polyglycidyl thioethers of polyhydric thiols, for example of bis-mercaptomethyl benzene, diglycidyl-trimethylene trisulphone, are also of interest.

It is also possible to use glycidyl esters of polybasic aromatic, aliphatic and cycloaliphatic carboxylic acids, for example phthalic acid diglycidyl ester, isophthalic acid diglycidyl ester, terephthalic acid diglycidyl ester, tetrahydrophthalic acid diglycidyl ester, adipic acid diglycidyl ester, hexahydrophthalic acid diglycidyl ester which may optionally be substituted by methyl groups, and glycidyl esters of reaction products of 1 mol of an aromatic or cycloaliphatic dicarboxylic acid anhydride and ½ mole of a diol or 1/n mole of a polyol with n- hydroxyl groups, for example glycidyl carboxylic acid esters corresponding to the general formula

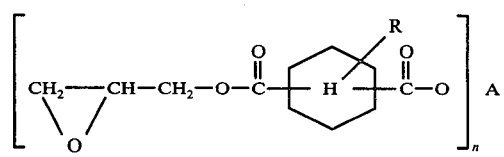

in which A represents an at least difunctional radical of an aliphatic hydrocarbon optionally interrupted by oxygen and/or cycloaliphatic rings, or the difunctional radical of a cycloaliphatic hydrocarbon, R represents hydrogen or alkyl radicals with 1 to 3 carbon atoms and $n$ is a number from 2 to 6, or mixtures of glycidyl carboxylic acid esters corresponding to the above general formula (cf. British Patent Specification No. 1,220,702).

The following polyepoxide compounds or mixtures thereof are preferably used for the process according to the invention: polyglycidyl ethers of polyhydric phenols, more especially of bisphenol A; phthalic acid diglycidyl ester, isophthalic acid diglycidyl ester, terephthalic acid diglycidyl ester, polyglycidyl esters of cycloaliphatic dicarboxylic acids, more especially hexahydrophthalic acid diglycidyl ester and polyepoxides of the reaction product of $n$ moles of hexahydrophthalic acid and/or phthalic acid anhydride and 1 mole of a polyol with $n$ hydroxyl groups ($n$ = integar from 2 to 6), more especially of 3 moles of hexahydrophthalic acid anhydride and/or phthalic acid anhydride and 1 mole of 1,1,1-trimethylol propane, polyepoxides of an esterification product of 2 moles of p-hydroxybenzoic acid and 1 mole of tetraethylene glycol, followed by reaction with epichlorhydrin.

Bisphenol-A-polyglycidyl ethers are particularly preferred.

One or more nitrogen compounds of the following formula are used for the process according to the invention:

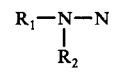

in this formula, $R_1$ represents hydrogen; $C_1$-$C_{18}$-alkyl, preferably $C_1$-$C_6$-alkyl; hydroxyalkyl with 2 to 18 and preferably with 2 to 4 carbon atoms in the alkyl moiety; β-alkoxyalkyl with 2 to 18 and preferably with 2 to 4 carbon atoms in the alkyl moiety and 1 to 4 carbon atoms in the alkoxy moiety; β-alkoxy carbonyl alkyl with 2 to 18 carbon atoms and preferably with 2 to 4 carbon atoms in the alkyl and with 1 to 4 carbon atoms in the alkoxy moiety; β-cyanoalkyl with 1 to 18 and preferably with 2 to 6 carbon atoms in the alkyl moiety; N-dialkylaminoalkyl with 1 to 12 carbon atoms and preferably with 2 to 4 carbon atoms in the alkyl moiety and with 1 to 4 carbon atoms in the N-alkylamino moiety, $R_2$ may have any of the meanings of $R_1$ and may also represent carboxyalkyl with 1 to 6 carbon atoms in the alkyl moiety and aminoalkyl with 2 to 6 carbon atoms in the alkyl radical or an aminoalkyl group interrupted by one or more NH- or N-$CH_3$-groups; in addition $R_1$ and $R_2$, together with the nitrogen atom, form a piperidine or pyrrolidine ring. The alkyl groups may be linear or branched chain.

Preferred compounds are those in which $R_1$ and $R_2$ represent hydrogen, alkyl and β-hydroxyalkyl, carboxyalkyl and aminoalkyl.

The following compounds are mentioned by name: ammonia, methylamine, dimethylamine, ethylamine, diethylamine, n-propylamine, di-n-propylamine, isopropylamine, diisopropylamine, n-butylamine, di-n-butylamine, methylpropylamine, ethyl methylamine, butyl methylamine, ethyl butylamine, sec.-butylamine, isobutylamine, diisobutylamine, tert.-butylamine, di-tert.-butylamine, n-amylamine, methylisoamylamine, cyclohexylamine, dicyclohexylamine, methyl cyclohexylamine, ethyl cyclohexylamine, propyl cyclohexylamine, cyclopentylamine, dicyclopentylamine, cyclopentylmethylamine, pyrrolidine, piperidine, ethanolamine, 3-amino-1-propanol, 1-amino-2-propanol, N-methyl ethanolamine, N-phenyl ethanolamine, 1-amino-3-butanol, N-cyclohexyl ethanolamine, N-dodecyl ethanolamine, N-cyclohexyl isopropylamine, diethanolamine, diisopropanolamine, 2-amino-2-methyl-3-propane diol, N,N-dimethyl ethylene diamine, N,N-diethyl ethylene diamine, N-trimethyl ethylene diamine, N-triethyl ethylene diamine, aminoacetic acid, ε-aminocaproic acid, ethylene diamine, butylene diamines, hexamethylene diamine, diethylene triamine, triethylene tetramine, etc.

The following compounds in particular are used: ammonia, ethanolamine, diethanolamine, 1-amino-2-propanol (= isopropanolamine), diisopropanolamine, dimethylamine, diethylamine, dibutylamine, methylamine, ethylamine, butylamine(s), ε-aminocaproic acid and hexamethylene diamine.

From 0.01 to 0.5 NH-equivalents and preferably from 0.01 to 0.3 NH-equivalents of ammonia or of the above-mentioned amines or aminocarboxylic acid are used per epoxide equivalent. In the context of the invention, an NH-equivalent is the quantity of ammonia or amine in grams which contains one gram atom of hydrogen attached to nitrogen.

Reaction of the nitrogen compounds with the polyepoxides may be carried out in different ways, for example in the presence or absence of an inert solvent such as methanol, ethanol, propanol, isopropanol, butanol, isobutanol, sec.-butanol, tert.-butanol, cyclohexanol, 2-ethyl-1-hexanol, benzene, xylene, toluene, hexane, heptane, octane, isooctane, cyclopentane, cyclohexane, cycloheptane, cyclopentanone, cyclohexanone, methylacetate, ethylacetate, propylacetate, n-butylacetate, chloroform, carbontetrachloride, trichloroethane, dichloroethane, tetrachloroethane and chlorobenzene. The reaction may readily be carried out at temperatures in the range from 20° to 90° C and preferably at temperatures in the range from 40° to 90° C. In exceptional cases, these temperatures may be exceeded at either end of the range.

The reaction products of the polyepoxides with ammonia and/or the aforementioned amines are β-hydroxypropyl ethers which are soluble in organic solvents and uncrosslinked. They always contain free epoxide groups.

Reaction of the polyepoxides with the nitrogen compounds is followed by the reaction with acrylic and/or methacrylic acid. From 0.4 to 0.9 and preferably from 0.4 to 0.6 carboxyl equivalents of (meth)acrylic acid are used per epoxide equivalent.

1 carboxyl equivalent is the quantity of carboxylic acid in grams which contains 1 gram mol of carboxyl groups.

Addition of the acrylic and/or methacrylic acid to the polyepoxides reacted with ammonia and/or the amines is carried out by methods known per se, for example by the methods according to U.S. Pat. Nos. 3,301,743 or 2,824,851 either in the presence or absence of the solvents mentioned above in reference to the reaction of the polyepoxides with the nitrogen compounds. If desired, addition of the (meth)acrylic acid may be carried out in the presence of about 0.01 to 3% by weight, based on starting epoxide, of such catalysts as tertiary amines, alkali metal hydroxides, alkali metal salts of organic carboxylic acids, mercaptans, dialkyl sulphides, bis-(hydroxyalkyl)-sulphides, sulphonium, phosphonium compounds, phosphines, arsines or stibines. Reaction temperatures of from 40° to 90° C have proved to be appropriate, although in special cases this temperature range may be exceeded or reduced.

After the polyepoxides have been reacted with acrylic and/or methacrylic acid, the epoxide groups still present are reacted with 0.09 to 0.50 carboxyl equivalents and preferably with 0.1 to 0.5 carboxyl equivalents, based on one epoxide equivalent, of a saturated aliphatic, cycloaliphatic or aromatic monocarboxylic or dicarboxylic acid. Aliphatic saturated monocarboxylic and dicarboxylic acids are preferred.

After the three process stages 1) reaction of the polyepoxide with amines, 2) reaction with (meth)acrylic acid and 3) reaction with the saturated aliphatic, cycloaliphatic or aromatic carboxylic acids, at least 80% and preferably at least 90% of the epoxide groups originally present have reacted. Addition of the saturated aliphatic, cycloaliphatic or aromatic carboxylic acids may be carried out under the same conditions as the reaction with (meth)acrylic acid.

Suitable aliphatic saturated monocarboxylic and dicarboxylic acids are those containing from 1 to 12 carbon atoms, preferably 2 to 9 carbon atoms. The cycloaliphatic and aromatic monocarboxylic and dicarboxylic acids contain from 6 to 20 carbon atoms and preferably from 7 to 12 carbon atoms.

The following acids are mentioned by way of example: formic acid, acetic acid, propionic acid, butyric acids, valeric acid and its isomers, caproic acid and its isomers, oenanthic acid and its isomers, caprylic acid and its isomers, pelargonic acid and its isomers, for example 2-ethyl hexane carboxylic acid, lauric acid and its isomers, oxalic acid, malonic acid, succinic acid, glutaric acid, adipic acid, azelaic acid, sebacic acid, cyclopentane carboxylic acid, hexahydrobenzoic acid, hexahydrophthalic acid, methyl hexahydrophthalic acid, benzoic acid, toluene carboxylic acids, phthalic acid, the reaction product of 1 mol of the dialkali salt of bisphenol A and 2 mols of chloroacetic acid, etc.

In order to protect the polymerisable reaction products according to the invention against undesirable premature polymerisation, it is advisable to add during their preparation from 0.001 to 0.1% by weight, based on the on the binder, of polymerisation inhibitors or antioxidants.

Suitable additives of this type are, for example, phenols and phenol derivatives, preferably sterically hindered phenols which contain alkyl substituents with 1 to 6 carbon atoms in both o-positions to the phenolic hydroxy group, amines, preferably secondary acrylamines and their derivatives, quinones, copper-I-salts of organic acids or addition compounds of copper(I)halides with phosphites.

The following compounds are mentioned by way of example: 4,4'-bis-(2,6-di-tert.-butyl phenol), 1,3,5-trimethyl-2,4,6-tris-(3,5-di-tert.-butyl-4-hydroxy benzyl)-benzene, 4,4'-butylidene-bis-(6-tert.-butyl-m-cresol), 3,5-di-tert.-butyl-4-hydroxybenzyl phosphonic acid diethyl ester, N,N'-bis-(β-naphthyl)-p-phenylene diamine, N,N'-bis-(1-methyl heptyl)-p-phenylene diamine, phenyl-β-naphthylamine, 4,4'-bis-(α,α-dimethyl benzyl)-diphenylamine, 1,3,5-tris-(3,5-di-tert.-butyl-4-hydroxy hydrocinnamoyl)-hexahydro-s-triazine, hydroquinone, p-benzoquinone, 2,5-di-tert.-butyl quinone, toluhydroquinone, p-tert.-butyl pyrocatechol, 3-methyl pyrocatechol, 4-ethyl pyrocatechol, chloranil, naphthoquinone, copper naphthenate, copper octoate, Cu-(I)Cl/triphenyl phosphite, Cu(I)-Cl/trimethyl phosphite, Cu(I)Cl/trischloroethyl phosphite. Cu(I)Cl/tripropyl phosphite, p-nitrosodimethyl aniline.

Other suitable stabilishers are described in "Methoden der organischen Chemie" (Houben-Weyl), 4th Edition, Vol. XIV/1, pp. 433-452, 756, Georg Thieme Verlag, Stuttgart, 1961. Examples of particularly suitable stabilisers are p-benzoquinone and/or hydroquinone monomethyl ether used in a concentration of 0.001 to 0.05% by weight, based on the mixture as a whole.

In some cases, the reaction products according to the invention may be used without the addition of copolymerisable monomers or solvents. However, since the reaction products according to the invention are in many cases highly viscous products, it is advisable to mix them with copolymerisable monomers in order to obtain processable viscosities and/or in order to vary the properties of the hardening products.

Suitable monomers are:
1. Esters of acrylic or methacrylic acid with aliphatic $C_1$-$C_8$, cycloaliphatic $C_5$-$C_6$, araliphatic $C_7$-$C_8$- monoalcohols, for example methylacrylate, ethylacrylate, n-propylacrylate, n-butylacrylate, methylhexylacrylate, 2-ethyl-hexylacrylate and the corresponding methacrylic acid esters; cyclopentylacrylate, cyclohexylacrylate or the corresponding methacrylic acid esters; benzylacrylate, β-phenylethylacrylate and corresponding methacrylic acid esters;
2. Hydroxyalkyl esters of acrylic acid or methacrylic acid with 2 to 4 carbon atoms in the alcohol component, such as 2-hydroxyethylacrylate, 2-hydroxypropylacrylate, 3-hydroxypropylacrylate, 2-hydroxybutylacrylate, 4-hydroxybutylacrylate or corresponding methacrylic acid esters;
3. Diacrylates and polyacrylates, also dimethacrylates and polymethacrylates of glycols with 2 to 6 carbon atoms and polyols with 3 to 4 hydroxyl groups and 3 to 6 carbon atoms, such as ethylene glycol diacrylate, 1,3-propane diol diacrylate, 1,4-butane diol diacrylate, 1,6-hexane diol diacrylate, trimethylol propane triacrylate, pentaerythritol tri- and tetraacrylate and corresponding methacrylates, also di(meth)acrylates of polyether glycols of glycol, 1,3-propane diol, 1,4-butane diol;
4. Aromatic vinyl and divinyl compounds such as styrene, methyl styrene, divinylbenzene;
5. N-methylol acrylamide or N-methylol methacrylamide and corresponding N-methylolalkyl ethers with 1 to 4 carbon atoms in the alkyl ether group and corresponding N-methylolallyl ethers, more especially N-methoxy methyl (meth)acrylamide, N-butoxymethyl(meth)acrylamide and N-allyloxymethyl(meth)acrylamide;
6. Vinylalkyl ethers with 1 to 4 carbon atoms in the alkyl group, such as vinylmethyl ether, vinylethyl ether, vinylpropyl ether and vinylbutyl ether;
7. Trimethylol propane diallyl ether mono(meth)acrylate, vinyl pyridine, N-vinyl carbazole, triallyl phosphate, triallyl isocyanurate and others.

It is also possible to use mixtures of one or more of the aforementioned monomers. The additions amount to between about 5 and 65% by weight and preferably to between 20 and 40% by weight, based on the mixture of reaction products according to the invention together with additional monomers and solvent if present.

Similarly, a suitable viscosity may be adjusted by admixture with inert solvents, such as butylacetate, ethylacetate, ethanol, isopropanol, butanol, acetone, ethylmethyl ketone, diethyl ketone, cyclohexane, cyclohexanone, cyclopentane, cyclopentanone, n-heptane, n-hexane, n-octane, isooctane, toluene, xylene, methylene chloride, chloroform, 1,1-dichloroethane, 1,2-dichloroethane, 1,1,2-trichloroethane, carbon tetrachloride. In order to obtain a processible viscosity, it is possible to add from 5 to 50% by weight and preferably from 20 to 40% by weight of solvents, based on the mixture of reaction product according to the invention solvent and additional monomers if present.

It is of course also possible to use mixtures of additional monomers and solvents within the quantitative ratios indicated.

Hardening of the reaction products according to the invention, optionally in admixture with other copolymerisable monomers, may be obtained by exposure to high-energy radiation, such as UV-light, electron beams, gamma rays or in the presence of radical donors such as thermal polymerisation initiators.

The reaction products according to the invention are preferably used as coating compositions hardenable by UV-light, their particular advantage being that they harden in very short times. Photoinitiators have to be added for this application. Hardening is optionally carried out in an inert gas atmosphere.

Suitable photoinitiators include the compounds normally used for this purpose, for example benzophenone and, quite generally, aromatic keto compounds of the type derived from benzophenone, such as alkyl benzophenones, halogen-methylated benzophenones according to German Offenlegungsschrift No. 1,949,010, Michlers ketone, anthrone, halogenated benzophenones. Other active photoinitiators include anthraquinone and many of its derivatives, for example β-methyl anthraquinone, tert.-butyl anthraquinone, tert.-butyl anthraquinone and anthraquinone carboxylic acid esters, also oxime esters according to German Offenlegungsschrift No. 1,795,089. Other suitable photoinitiators are benzoin and its derivatives, for example according to German Offenlegungsschrifts Nos. 1,769,168; 1,769,853; 1,769,854; 1,807,297; 1,807,301; 1,919,678 and German Auslegeschrift 1,694,149.

Particularly preferred photoinitiators for hardening the reaction products according to the invention, optionally in the presence of other monomers, are benzophenone and benzoin derivatives corresponding to the general formula $$\underset{Ar}{\overset{O}{\underset{\|}{C}}}-\underset{\underset{R_1}{\overset{|}{O}}}{\overset{R_2}{\underset{|}{C}}}-Ar$$

in which Ar is an unsubstituted or an alkyl-, alkoxy-, halogen-substituted aromatic radical;

$R_1$ = straight-chain or branched chain alkyl radical with ($C_1$-$C_{12}$), aryl such as phenyl, cycloalkyl such as cyclohexyl, tetrahydropyranyl and 1-methoxyethyl;

$R_2$ = alkoxy with 1 to 6 carbon atoms, allyl, benzyl, optionally substituted by halogen, or the radical —$CH_2$—$CH_2$—X with X=CN, $CONH_2$, $COOR_3$ and $R_3$ = H, lower alkyl ($C_1$-$C_{10}$).

Preferably, Ar represents phenyl, $R_1$ represents a linear or branched chain alkyl radical with 1 to 4 carbon atoms; and $R_2$ = allyl or the radical —$CH_2$—$CH_2$—X with X=CN and $COOR_3$, $R_3$ = $C_1$—$C_4$—alkyl.

The following are examples of suitable compounds of this type (cf. German Offenlegungsschrift No. 1,769,854):

α-allylbenzoin methyl ether, α-allylbenzoin isopropyl ether, α-allylbenzoin ethyl ether, α-allylbenzoin butyl ether, α-allylbenzoin propyl ether, α-allylbenzoin octyl ether, α-allylbenzoin dodecyl ether, α-benzylbenzoin methyl ether, α-benzylbenzoin ethyl ether, α-benzylbenzoin propyl ether, α-benzylbenzoin isopropyl ether, α-benzylbenzoin butyl ether, α-(2-cyanoethyl)-benzoin methyl ether, α-(2-cyanoethyl)-benzoin ethyl ether, α-(2-cyanoethyl)-benzoin propyl ether, α-(2-cyanoethyl)-benzoin isopropyl ether, α-(2-cyanoethyl)-benzoin butyl ether, α-(2-cyanoethyl)-benzoin isobutyl ether, α-(2-cyanoethyl)-benzoin hexyl ether, α-(2-cyanoethyl)-benzoin octyl ether, α-(2-cyanoethyl)-benzoin dodecyl ether, α-(2-cyanoethyl)-benzoin isooctyl ether, α-(2-carboxyethyl)-benzoin methyl ether, α-(2-carboxyethyl)-benzoin ethyl ether, α-(2-carboxyethyl)-benzoin propyl ether, α-(2-carboxyethyl)-benzoin isopropyl ether, 60-(2-carboxyethyl)-benzoin butyl ether, α-(2-carboxyethyl)-benzoin isobutyl ether, α-(2-carboxyethyl)-benzoin hexyl ether, α-(2-carboxyethyl)-benzoin octyl ether, α-(2-carboxyethyl)-benzoin dodecyl ether, α-(2-carboxyethyl)-benzoin isooctyl ether, α-(2-carbomethoxyl-ethyl)-benzoin methyl ether, α-(2-carbomethoxyethyl)-benzoin ethyl ether, α-(2-carbomethoxyethyl)-benzoin propyl ether, α-(2-carbomethoxyethyl)-benzoin isopropyl ether, α-(2-carbomethoxyethyl)-benzoin butyl ether, α-(2-carbomethoxyethyl)-benzoin isobutyl ether, α-(2-carbomethoxyethyl)-benzoin hexyl ether, α-(2-carbomethoxylethyl)-benzoin octyl ether, α-(2-carbomethoxylethyl)benzoin dodecyl ether, α-(2-carbomethoxylethyl)-benzoin isooctyl ether, α-(2-carboethoxyethyl)-benzoin methyl ether, α-(2-carboethoxyethyl)-benzoin ethyl ether, α-(2-carboethoxyethyl)-benzoin propyl ether, α-(2-carboethoxyethyl)-benzoin isopropyl ether, α-(2-carboethoxyethyl)-benzoin butyl ether, α-(2-carboethoxyethyl)-benzoin isobutyl ether, α-(2-carboethoxyethyl)-benzoin hexyl ether, α-(2-carboethoxyethyl)-benzoin octyl ether, α-(2-carboethoxyethyl)-benzoin dodecyl ether, α-(2-carboethoxyethyl)-benzoin isooctyl ether, α-(2-carbopropoxyethyl)-benzoin methyl ether, α-(2-carbopropoxyethyl)-benzoin ethyl ether, α-(2-carbopropoxyethyl)-benzoin propyl ether, α-(2-carbopropoxyethyl)-benzoin isopropyl ether, α-(2-carbopropoxyethyl)-benzoin butyl ether, α-(2-carbopropoxyethyl)-benzoin isobutyl ether, α-(2-carbopropoxyethyl)-benzoin hexyl ether, α-(2-carbopropoxyethyl)-benzoin octyl ether, α-(2-carbopropoxyethyl)-benzoin dodecyl ether, α-(2-carbopropoxyethyl)-benzoin isooctyl ether, α-(2-carbo-n-butoxyethyl)-benzoin methyl ether, α-(2-carbo-n-butoxyethyl)-benzoin ethyl ether, α-(2-carbo-n-butoxyethyl)-benzoin propyl ether, α-(2-carbo-n-butoxyethyl)-benzoin isopropyl ether, α-(2-carbo-n-butoxyethyl)-benzoin butyl ether, α-(2-carbo-n-butoxyethyl)-benzoin isobutyl ether, α-(2-carbo-n-butoxyethyl)-benzoin hexyl ether, α-(2-carbo-n-butoxyethyl)-benzoin octyl ether, α-(2-carbo-n-butoxyethyl)-benzoin dodecyl ether, α-(2-carbo-n-butoxyethyl)-benzoin isoctyl ether, α-(2-carboisooctoxyethyl)-benzoin methyl ether, α-(2-carboisooctoxyethyl)-benzoin ethyl ether, α-(2-carboisooctoxyethyl)-benzoin propyl ether, α-(2-carboisooctoxyethyl)-benzoin isopropyl ether, α-(2-carboisooctoxyethyl)-benzoin butyl ether, α-(2-carboisooctoxyethyl)-benzoin isobutyl ether, α-(2-carboisooctoxyethyl)-benzoin hexyl ether, α-(2-carboisooctoxyethyl)-benzoin octyl ether, α-(2-carboisooctoxyethyl)-benzoin dodecyl ether, α-(2-carboisooctoxyethyl)-benzoin isooctyl ether, α-(2-carboamidoethyl)-benzoin methyl ether, α-(2-cyanoethyl)-benzoin tetrahydropyranyl ether, α-(2-cyanoethyl)-benzoin-(1-methoxyethyl ether, α-(2-carbomethoxyethyl)-benzoin tetrahydropyranyl ether, α-(2-carboethoxyethyl)-benzoin-(1-methoxyethylether), α-(2-carbo-n-butoxyethyl)-benzoin tetrahydropyranyl ether, α-(2-carboisooctoxyethyl)-benzoin tetrahydropyranyl ether.

By using these special α-substituted benzoin derivatives as photoinitiators, it is surprisngly possible to produce UV-light-hardening mixtures based on polyfunctional acrylic acid esters which, despite their extremely high reactivity under the action of UV-light, can be stored in darkness almost indefinitely.

The use of benzoin derivatives, more especially benzoin ethers, as photoinitiators is known and described in detail in the literature (for example H. G. Heine, H. J. Rosenkranz, H. Rudolph, Angew. Chemie 84, 1032–1036, 1972). However, it is also known that numerous attempts have been made to improve the unsatisfactory storability of systems consisting of polymerisable resins containing vinyl groups, vinyl monomers and benzoin derivatives as photoinitiators, by the addition of stabilisers (cf. German Auslegeschrift No. 1,902,930) or by selecting certain benzoin derivatives. A satisfactory solution to the problem of storability in darkness of the system now widely used in the lacquer industry, consisting of unsaturated polyester resin and styrene, was obtained by using secondary benzoin ethers (cf. German Auslegeschrift No. 1,694,149). In the highly reactive resin systems according to the invention, however, they cause total gelation after storage for only a few hours at 60° C. By contrast, completely storable mixtures can be obtained in this case by using α-substituted benzoin ethers.

In addition, the α-substituted benzoin derivatives cause hardly any discoloration when used in thin layer thicknesses (2 – 20 μ). The UV-light-hardening compositions produced with them are thus particularly suitable for coating paper, light woods and plastics.

The above-mentioned photoinitiators, which are used in quantities of from 0.1 to 20% by weight, and preferably in quantities of from 0.1 to 5% by weight, based on polymerisable components, according to the purpose for which the compositions according to the invention are intended, may be used either individually or, on account of frequent advantageous synergistic effects, in combination with one another.

In many cases, it can be advantageous, whether for improving the film-forming properties of the resin compositions or for obtaining a particularly scratch-proof surface of the layers, to introduce further additives. Thus, the resin compositions may be mixed with other resins, for example with saturated or unsaturated polyester resins.

The resins are preferably used in quantities of from 1 to 50% by weight, based on the polymerisable components. Basically, however, only resins of this type should be used for mixing and the quantity in which they are used limited to such an extent that reactivity is not adversely affected. Suitable lacquers-grade resins of the type commonly used in the lacquer industry are described in E. Karsten's Lackrohstofftabellen, 5th Edition, Curt R. Vincentz Verlag, Hannover, 1972, pages 74–106, 195–258, 267–293, 335–347, 357–366.

Advantageous additives which can lead to a further increase in reactivity are certain tertiary amines for example, triethylamine and triethanolamine. A similar effect can be obtained by adding mercapto compounds such as dodecyl mercaptan, thioglycolic acid esters, thiophenol or mercaptoethanol. The above-mentioned substances are preferably used in quantities of from 0 to 5% by weight, based on the polymerisable components.

Radiation sources suitable for carrying out the photopolymerisation reaction include artificial-light sources which emit in the range from 2500 to 5000 A and preferably in the range from 3,000 to 4000 A. It is advantageous to use mercury vapour lamps, xenon and tungsten lamps, more especially high-pressure mercury lamps.

In general, layers of the reaction products according to the invention with a thickness of from 1 μm to 0.1mm (1 μm = $10^{-3}$ mm) can be hardened into a film in less than 1 second when exposed to the light of a high pressure mercury lamp, for example of the Philips HTQ-7 type, arranged at a distance of approximately 8 cm.

In cases where fillers are used in the application of the resin compositions according to the invention as UV-light-hardening coatings, their use is restricted to those which do not interfere with polymerisation through their absorption behaviour. For example, it is possible to use talcum, heavy spar, chalk, gypsum, silicas, asbestos powders and light spar as light-permeable fillers. It is even possible to use $TiO_2$ in extremely thin layers.

In cases where hardening is obtained by thermal initiators or by high-energy radiation, for example electron radiation or γ-radiation, it is possible in principle to use any fillers, pigments and reinforcing materials of the type commonly used in lacquer chemistry.

In cases where the resins according to the invention are hardened in the presence of from 0.1 to 10.0% by weight, based on polymerisable components, of thermal polymerisation initiators, the layer thicknesses may amount to between 1 μm and 1 mm.

Suitable thermal polymerisation initiators are, for example, diacyl peroxides such as diacetyl peroxide, dibenzoyl peroxide, di-p-chlorobenzoyl peroxide, dilauroyl peroxide, peroxy esters, such as tert.-butyl peroxy dicarbonate, alkyl peroxides, such as bis-(tert.-butyl peroxy butane), dicumyl peroxide, tert.-butyl cumyl peroxide, tert.-butyl cumyl peroxide, hydroperoxides, such as cumene hydroperoxide, tert.-butyl hydroperoxide, ketoperoxides, such as cyclohexanone hydroperoxide, methylethyl ketone hydroperoxide, acetyl acetone peroxide or azodiisobutyrodinitrile. In many cases, it is often advantageous to add accelerators, such as aromatic amines, cobalt or vanadium salts of organic acids, to the thermal polymerisation initiators.

The drying times of the reaction products according to the invention, optionally in admixture with other copolymerisable monomers and/or solvents, in the presence of thermal polymerisation initiators and, optionally, accelerators, can be up to 8 hours.

The coating compositions are applied to suitable substrates by the methods normally used in the lacquer industry, such as spray coating, roll coating, knife coating, printing, dip coating, flood coating, spread coating, brush coating.

Suitable substrates are paper, cardboards, leather, wood, plastic, textiles, ceramic materials, metals, preferably paper and cardboards. Since the coating compositions harden in time periods of from fractions of a second to a few seconds to form films with excellent mechanical properties, it is possible, for example, to adapt a paper coating process to the processing speeds normally encountered in printing.

The viscosities quoted in the Examples were measured in a DIN-4-cup (4 mm nozzle) according to DIN 53 211 and expressed as the outflow time in seconds. The percentages relate to weight unless otherwise stated.

EXAMPLE 1

6800 g of bisphenol-A-bisglycidyl ether (epoxide equivalent 190) were heated to 60° C in a 10 liter three-necked flask equipped with a stirrer, a dropping funnel and a reflux condenser. 42.5 g (2.5 mols) of gaseous ammonia were introduced into the ether over a period of 20 hours at the same temperature. 68.4 g of thiodiglycol (catalyst) were then added, followed by the dropwise addition first of 1386 g (19.25 mols) of acrylic acid over a period of 2 hours at 60° C and then of 340 g (5.66 mols) of acetic acid over a period of 30 minutes. The mixture was then stirred at 60° C until an acid number of 0 was reached (titration with N/10 NaOH/bromthymol blue), stabilised with 0.05% by weight of p-methoxy phenol, based on the resin obtained, and then cooled to room temperature.

5 parts by weight of benzophenone and 55 parts by weight of ethyl acetate or 65 parts by weight of butyl acetate were then added to 95 parts by weight of the resin thus obtained. The resulting lacquers, hardenable by ultraviolet light, had a flowout time of 20 seconds from a 4 mm DIN cup.

Using a hand coater, the lacquers were coated in a layer thickness of 15 μm on to paper (weight 80 g/m$^2$) and cardboard (weight 350 g/m$^2$). Hardening took place with hardly any airing time and after an airing time of 60 seconds, carried out by the straight-through process using high-pressure mercury lamps of the Philips HTQ 7 type (load: 30 Watts/cm lamp length; 4 lamps) or of the Hanovia type (load: 80 Watts/cm of lamp length; 1 lamp) in associated reflector housings, distance of the lamps from the lacquered surfaces 10 cm.

The belt speeds at which tack-free and solvent-resistant lacquer coatings were obtained are shown in Table 1.

Application to paper and drying (with virtually no airing and in some cases, with 60 second's airing) were carried out in the same way as in Example 1.

The belt speeds at which tack-free and solvent-resistant lacquer coatings are obtained are shown in Table 3.

Table 3

| Acrylate | Quantity of acrylate parts by weight | Resin according to Example 1 parts by weight | Airing time [seconds] | Quantity of ethyl acetate parts by weight | Belt speed under 1 Hanovia or 4 Philips HTQ 7 [m/min] |
| --- | --- | --- | --- | --- | --- |
| A | 19 | 76 | 10 | 30 | 30 |
| A | 19 | 76 | 60 | 30 | 35 |
| A | 33 | 57 | 10 | 15 | 25 |
| A | 47.5 | 47.5 | 10 | 8 | 15 |
| B | 19 | 76 | 10 | 40 | 35 |
| B | 19 | 76 | 60 | 40 | 40 |
| B | 38 | 57 | 10 | 20 | 25 |
| B | 47.5 | 47.5 | 10 | 10 | 15 |
| C | 19 | 76 | 10 | 40 | 35 |
| C | 19 | 76 | 60 | 40 | 40 |
| C | 38 | 57 | 10 | 20 | 25 |
| C | 47.5 | 47.5 | 10 | 10 | 15 |
| D | 19 | 76 | 10 | 65 | 40 |
| D | 19 | 76 | 60 | 65 | 45 |
| D | 38 | 57 | 10 | 50 | 30 |
| D | 47.5 | 47.5 | 10 | 40 | 15 |

TABLE 1

| Solvent in the lacquer | Airing time [seconds] | Belt speed for drying in m/min under 1 Hanovia or 4 Philips HTQ 7 | |
| --- | --- | --- | --- |
| | | on paper | on cardboard |
| ethyl acetate | 10 | 40 | 25 |
| butyl acetate | 10 | 30 | 20 |
| ethyl acetate | 60 | 60 | 40 |
| butyl acetate | 60 | 50 | 30 |

The lacquer coatings may have a dry layer thickness of 8–20 μm and were extremely glossy, colourless and non-yellowing.

EXAMPLE 2

1 part by weight and 5 parts by weight of triethanolamine were additionally introduced per 95 parts by weight of resin and 5 parts by weight of benzophenone to the lacquer produced in accordance with Example 1 with ethyl acetate as solvent. Application and hardening were carried out with virtually no airing as described in Example 1.

The belt speeds at which tack-free and solvent-resistant lacquer coatings were obtained are shown in Table 2.

TABLE 2

| Addition of triethanolamine, parts by weight per 100 parts by weight of resin (UV-hardening) | Belt speed for drying in m/min under 1 Hanovia or 4 Philips HTQ 7 | |
| --- | --- | --- |
| | on paper | on cardboard |
| 1 | 45 | 30 |
| 5 | 60 | 40 |

EXAMPLE 3

The resin produced in accordance with Example 1 was mixed with various quantities of acrylic acid esters, such as 1,4-butane diol diacrylate (A), 1,6-hexane diol diacrylate (B), neopentyl glycol diacrylate (C) and trimethylol propane triacrylate (D), and for 95 parts of these mixtures with 5 parts by weight of benzophenone. A viscosity corresponding to an outflow time of 20 seconds (4 mm DIN-cup) is adjusted with ethyl acetate.

EXAMPLE 4

Resin produced in accordance with Example 1 was adjusted with various quantities of acrylic acid esters, such as 1,4-butane diol bisacrylate(A), 1,6-hexane diol bisacrylate (B), neopentyl glycol bisacrylate (C) and trimethylol propane triacrylate (D), to a viscosity of from 15 to 20 Pa.s. 5 parts by weight of benzophenone were added to 95 parts by weight of these mixtures.

Application to paper (weight 80 g/m$^2$) was carried out by means of a rubber roll after a relatively thin layer of the coating material had been produced on glass by rolling out on the rubber roll. Hardening was carried out in the same way as described in Example 1.

Table 4 shows the band speeds at which non-tacky and solvent-resistant lacquer finishes were obtained.

TABLE 4

| Acrylate | Resin according to Example 1 parts by weight | Quantity of the acrylate parts by weight | Belt speed under 1 Hanovia or 4 Philips HTQ 7 m/min |
| --- | --- | --- | --- |
| A | 75 | 20 | 35 |
| B | 72 | 23 | 40 |
| C | 72 | 23 | 40 |
| D | 47.5 | 47.5 | 15 |

The dry layer thickness amounted to between 2 and 3 μm.

If 23 parts by weight of 1,6-hexane diol bisacrylate, 5 parts by weight of benzophenone and 5 parts by weight of triethanolamine are added to the coating material of 72 parts by weight of resin according to Example 1, the belt speed can be increased to more than 60 meters per minute in order to obtain a dry surface.

EXAMPLE 4a 23.0 parts by weight of 1,6-hexane diol diacrylate and the photoinitiators shown in Table 5 were added to batches of 72 parts by weight of a resin according to Example 1. These preparations were applied to paper-coated chipboard using a film drawing unit with a 500 μm gap width, and the belt speed required for complete hardening on the straight-through principle was determined.

TABLE 5

| Photoinitiator used | Quantity % | Hardening under 1 Hanovia lamp(output 80 Watts) belt speed [m/min] |
|---|---|---|
| acetophenone | 2.5 | 2 |
| | 5.0 | 2 |
| benzophenone | 2.5 | 4 |
| | 5.0 | 4 |
| methyl benzophenone | 2.5 | 4 |
| | 5.0 | 4 |
| benzoyl benzalchloride | 2.5 | 10 – 12 |
| | 5.0 | 10 – 12 |
| benzoin | 2.5 | 15 – 20 |
| | 5.0 | 15 – 17 |
| benzoin ethyl ether | 2.5 | 15 – 20 |
| | 5.0 | 15 |
| benzoin isopropyl ether | 2.5 | 15 – 17 |
| | 5.0 | 15 |
| benzoin-tert-butyl ether | 2.5 | 15 |
| | 5.0 | 15 |
| α-hydroxy methyl benzoin | 2.5 | 20 – 25 |
| | 5.0 | 20 |
| α-hydroxy methyl benzoin methyl ether | 2.5 | 30 – 35 |
| | 5.0 | 30 – 35 |
| α-hydroxy methyl benzoin isopropyl ether | 2.5 | 30 – 35 |
| | 5.0 | 30 – 35 |
| α-allyl benzoin | 2.5 | 2 – 3 |
| | 5.0 | 2 – 3 |
| α-allyl benzoin isopropyl ether | 2.5 | 2 – 3 |
| | 5.0 | 2 – 3 |
| α-(β-cyanoethyl)-benzoin ethyl ether | 2.5 | 30 – 35 |
| | 5.0 | 30 – 35 |
| benzil dimethyl ketal | 2.5 | 25 – 30 |
| | 5.0 | 25 – 30 |
| benzil diethyl ketal | 2.5 | 25 – 30 |
| | 5.0 | 25 – 30 |

EXAMPLE 5

6800 g of bisphenol-A-bisglycidyl ether (epoxide equivalent 190) were heated in 55° C in a 10 liter three-necked flask equipped with a stirrer, a dropping funnel and a reflux condenser. 116 g (1.00 mol) of hexamethylene diamine are then added over a period of 3 hours at the same temperature. 68.4 g of thiodiglycol (catalyst) were then added, followed by the dropwise addition first of 1386 g (19.2 mols) of acrylic acid over a period of 2 hours at 60° C and then of 340g (5.66 mol) of acetic acid over a period of 30 minutes. The reaction mixture was then stirred at the same temperature until an acid number of 0 was reached (N/10 NaOH/bromthymol blue). The mixture was then stabilised with 0.05% by weight of p-Methoxyphenol, based on the resin obtained and subsequently cooled to room temperature.

95 parts by weight of the resin thus prepared were mixed with 5 parts by weight of benzophenone and 55 parts by weight of ethyl acetate, as a result of which a viscosity corresponding to a flowout time of 20 seconds from a 4 mm DIN cup was obtained. When the resin was applied to paper according to Example 1 in a layer thickness of 15 μm by means of a hand coater, crosslinking was achieved under 4 high pressure mercury lamps of the Philips HTQ 7 type at a belt speed of 35 m/min (straight-through process).

EXAMPLE 6

A resin was produced from the following components in accordance with Example 1:

6880 g of bisphenol-A-bisglycidyl ether (epoxide equivalent 190)
42.5 g of ammonia (2.5 mole)
1080 g of acrylic acid (15 mole)
68.4 g of thiodiglycol
750 g of acetic acid (12.6 mole)

After an acid number 0 has been reached, the resin was stabilised with 0.05% by weight of p-methoxy phenol and cooled to room temperature. 95 parts by weight of this resin mixed with 5 parts by weight of benzophenone and dissolved in 55 parts by weight of ethyl acetate had a viscosity corresponding to a flowout time of 20 seconds from a 4 mm DIN cup. After application to paper in the same way as described in Example 1, complete crosslinking was obtained in the straight-through process at a belt speed of 20 m/minute.

EXAMPLE 7

6800 g of bisphenol-A-bisglycidyl ether (epoxide equivalent 190) were heated to 60° C in a 10 liter three-necked flask equipped with a stirrer, dropping funnel and reflux condenser. 42.5 g (2.5 mols) of gaseous ammonia were introduced into the reaction solution over a period of 20 hours at the same temperature. 68.4 g of thiodiglycol (catalyst) were then added, followed by the dropwise addition first of 1386 g (19.25 mols) of acrylic acid over a period of 2 hours at 60° C and then of 480 g (8.0 mols) of acetic acid over a period of 30 minutes. The reaction mixture was stirred at 60° C until an acid number of 0 was reached (titration with N/10 NaOH/bromthymol blue), stabilised with 0.05% by weight of p-methoxy phenol and cooled to room temperature.

A mixture of this resin (95 parts by weight of resin and 5 parts by weight of benzophenone) in 55 parts by weight of ethyl acetate had a viscosity corresponding to a flowout time of 20 seconds from a 4 mm DIN cup. Complete crosslinking in accordance with Example 1 was obtained at a belt speed of 40 m/minute.

EXAMPLE 8a

A resin was prepared from the following reaction components in accordance with Example 7:

6800 g of bisphenol-A-bisglycidyl ether (epoxy equivalent 190)
42.5 g of ammonia (2.5 moles)
13.86 g of acrylic acid (19.6 moles)
68.4 g of thiodiglycol
1152 g of ethyl hexanoic acid (8.0 moles)

After an acid number of 0 has been reached, the resin was stabilised with 0.05% by weight of p-methoxy phenol and cooled to room temperature.

EXAMPLE 8b

A resin was produced in the same way as in Example 8a, except that 584 g (4.0 mols) of adipic acid were used instead of 1152 g of ethyl hexanoic acid.

EXAMPLE 8c

A resin produced in the same way as in Example 8a, except that 1024 g (8.0 mols) of hexahydrobenzoic acid are used instead of ethyl hexanoic acid.

APPLICATION 95 parts by weight of the resins of Example 8a, 8b and 8c were mixed with 5 parts by weight of benzophenone and dissolved in 55 parts by weight of ethyl acetate. They then had a viscosity corresponding to a flowout time of appoximately 20 seconds from a DIN 4 cup.

Following application to sheets of paper in the same way as in Example 1, complete crosslinking was obtained in the straight-through process at the following belt speeds: in the case of resins 8a and 8c at belt speeds of 35 m/min, and in the case of resin 8b at a belt speed of 40 m/min.

EXAMPLE 9

A resin was produced from the following components in accordance with Example 7:
  6800 g of bisphenol-A-bisglycidyl ether (epoxy equivalent 190)
  327 g of ε-amino caproic acid (2.5 moles)
  1386 g of acrylic acid (19.6)
  68.4 g of thiodiglycol
  480 g of acetic acid (8 moles)

After an acid number of 0 had been reached (N/10 NaOH/bromthymol blue), the resin was stabilised with 0.05% by weight of p-methoxy phenol. 95 parts by weight of the resin were dissolved in 57 parts by weight of ethyl acetate, followed by the addition of 5 parts by weight of benzophenone. The preparation had a viscosity corresponding to a flowout time of 20 seconds from a 4 mm DIN cup. Following application to sheets of paper in the same way as described in Example 1, a belt speed of 40 m/min was obtained under the usual conditions of the straight-through process.

EXAMPLE 10

Lacquer according to Example 1 with ethyl acetate as solvent was applied to an aluminium foil with a screen roller (No. 40 screen). Hardening took place with virtually no airing, being carried out by the straight-through process under a high pressure mercury vapour lamp of the Hanovia type (load 80 Watts/cm lamp length), lamp in an associated reflector housing, distance of lamp from the lacquered surface 10 cm.

A non-tacky, firmly adhering lacquer coating was obtained at a belt speed of 60 m/minute.

EXAMPLE 11

23 parts by weight of 1,6-hexane diol diacrylate and 5 parts by weight of benzophenone were added to 72 parts by weight of the resin according to Example 1. The preparation was applied to aluminium foil in the same way as in Example 4 and hardened as described in Example 10. A non-tacky firmly adhering lacquer coating was obtained at a belt speed of 60 m/minute.

EXAMPLE 12

150 parts by weight of titanium dioxide were added to 100 parts by weight of the resin according to Example 10. A viscosity corresponding to a flowout time of 100 seconds from a 4 mm DIN cup was adjusted with 50 parts by weight of butyl acetate and 25 parts by weight of ethyl glycol acetate.

The lacquer was applied to aluminium foil in a layer thickness of 15 μm using a hand coater. Airing and hardening were carried out in the same way as in Example 1.

A non-tacky, firmly adhering pigmented lacquer coating was obtained at a belt speed of 6 m/minute. The dry layer thickness amounted to between 9 and 10 μm.

If 5 parts by weight of triethanolamine were added to 100 parts by weight of the lacquer, the belt speed was increased to 8 meters per minute.

EXAMPLE 13

23 parts by weight of 1,6-hexane dioldiacrylate, 5 parts by weight of benzophenone and 100 parts by weight of titanium dioxide were added to 72 parts by weight of the resin according to Example 1. The preparation was applied with a rubber roller in the same way as in Example 4, and hardened in the same way as described in Example 9.

A non-tacky, firmly adhering pigmented lacquer coating was obtained at a belt speed of 10 m/minute. The dry layer thickness amounted to between 3 and 4 μm.

When 5 parts by weight of triethanolamine were added to 100 parts by weight of the lacquer, the belt speed increased to 12 m/min.

EXAMPLE 14

2.5 parts by weight of benzophenone and 50 parts by weight of butyl acetate were added to 97.5 parts by weight of the resin according to Example 1. The lacquer had a viscosity corresponding to a flowout time of 60 seconds from a 4 mm DIN cup. Using a roller-type lacquering machine, the lacquer was applied in a thickness of approximately 25 g/m² to a veneered chipboard provided with a sanded polyester coating. After airing for 15 seconds, the lacquer coating was hardened by the straight-through process under high-pressure mercury vapour lamps of the Philips HTQ 7 type or of the Hanovia type in associated reflector housings, distance of the lamp from the lacquered surface 10 cm. The belt speeds at which tack-free and solvent-resistant lacquer coatings were obtained are shown in Table 7.

TABLE 6

| Belt speed for drying on sanded UPE | | |
| --- | --- | --- |
| Under 4 Philips HTQ 7 | or 20 m/min | 1 Hanovia |

EXAMPLE 15

2.5 parts by weight of α-methyl benzoin methyl ether, 14 parts by weight of disperse silicas (matting agent) and 55 parts by weight of butyl acetate were added to 97.5 parts by weight of the resin according to Example 1. The resin had a viscosity corresponding to a flowout time of 60 seconds from a 4 mm DIN cup.

Using a roller type lacquering machine, the lacquer was applied in a thickness of about 25 g/m² to walnut veneer on chipboard (undercoat). After airing for 15 seconds, the lacquer coating was hardened by the straight-through process under high pressure mercury vapour lamps of the Philips HTQ 7 type or of the Hanovia type in associated reflector housings, distance of the lamp(s) from the lacquered surface 10 cm.

The belt speeds at which non-tacky and solvent-resistant lacquer coatings were obtained are shown in Table 6.

TABLE 7

| Belt speed for drying on walnut veneer | | |
| --- | --- | --- |
| Under 4 Philips HTQ 7 | or 25 m/minute | under 1 Hanovia |

After gentle sanding the roller coating (on this occasion approximately 15 g/m³), airing and hardening were repeated (top coat). A tack-free lacquer coating of satisfactory appearance was obtained.

EXAMPLE 16

The procedure was as described in Example 14, except that 2.5 parts by weight of α-methyl benzoin ethyl ether were used instead of 2.5 parts by weight of benzophenone. The belt speeds shown in Table 8 were obtained:

TABLE 8

| Belt speed for drying on sanded UPE | | |
| --- | --- | --- |
| Under 4 Philips HTQ 7 | or | under 1 Hanovia |
| | 25 m/minute | |

EXAMPLE 17

2.5 parts by weight of α-methyl benzoin ethyl ether, 14 parts by weight of disperse silicas (matting agent) and 60 parts by weight of butyl acetate were added to 97.5 parts by weight of the resin produced in accordance with Example 1.

Coating, airing and hardening of the lacquer were carried out in the same way as in Example 15.

Under a high pressure mercury vapour lamp of the Hanovia type, the belt speed required to obtain a dry surface for undercoat and top coat was 25 m/minute.

EXAMPLE 18

190 parts by weight of 1,6-hexane diol diacrylate, 16 parts by weight of disperse silicas (matting agents) and 7.5 parts of α-methyl benzoin ethyl ether were added to 100 parts by weight of the resin according to Example 1. The flowout time from a 4 mm DIN cup was 60 seconds. The lacquer was applied in a thickness of about 20 g/m² to a veneered chipboard provided with a standard priming coat. The lacquer was hardened under 30 super actinic fluorescent lamps of the Philips TL-AK type (12 lamps/m tunnel length, distance of lamps from lacquer coating 5 cm (inert gas atmosphere). Complete hardening was then carried out under a single high pressure mercury vapour lamp of the Hanovia type. (Distance of lamp from lacquer surface 10 cm). The belt speed was 30 m/minute.

A matt scratchproof lacquer coating was obtained.

EXAMPLE 19

155 parts by weight of 1,6-hexane diol diacrylate and 6 parts by weight of α-methyl benzoin ethyl ether were added to 100 parts by weight of the resin produced in accordance with Example 1. The flowout time from a 4 mm DIN cup amounted to 40 seconds. The lacquer was cast (with a casting machine) in a thickness of 300 g/m² on to a chipboard provided with a hardened rolled-on screed and a mottled pattern.

Hardening was carried out by initially gelling the lacquer to form a non-tacky surface under 30 super actinic fluorescent lamps of the Philips TL AK type (12 lamps/meter of tunnel length, distance of lamps from lacquer surface 5 cm) in an inert gas atmosphere. Complete hardening was then carried out under a high pressure mercury vapour lamp of the Hanovia type (distance of lamp from lacquer surface 10 cm). The belt speed was 20 m/minute.

A satisfactory, high-glass, hard, scratchproof and non-tacky lacquer coating was obtained.

EXAMPLE 20

A resin produced in accordance with Example 7 was processed in accordance with the following composition into a light-hardening screed:
 48.75 g of resin according to example 7
 48.75 g of 1,6-hexane diol diacrylate
 2.50 g of α-(β-cyanoethyl)-benzoin ethyl ether
 50.00 g of light spar
 100.00 g of talcum
 1.00 g of silica The screed thus obtained was rolled onto a chipboard in a thickness of 150 g/m² and hardened under a Hanovia lamp (load 80 Watt/cm lamp length ) arranged at a distance of 10 cm at a belt speed of 20 m/minute. After cooling to room temperature, the screed could be sanded and further processed.

EXAMPLE 21

40 parts by weight of the resin of Example 7 were mixed with 60 parts by weight of trimethylol propane triacrylate, a viscosity of 21Pa.s being obtained. This resin was used as binder for the production of a casting lacquer, a roller lacquer and a roller screed for hardening under electron beams.

a. casting lacquer, pigmented, matt
 100 parts by weight of resin
 40 parts by weight of titanium dioxide (rutile)
 18 parts by weight of highly disperse silica
 0.2 parts by weight of polybutadiene oil(molecular weight approximately 3000)
 2.5 parts by weight of polyphenyl methyl siloxane (1% in ethyl acetate) as levelling agent
 95 parts by weight of 1,6-hexane diol diacrylate This white lacquer, which had a flowout viscosity of 35 seconds from a DIN-4-cup, was cast on to screeded chipboard in a thickness of approximately 120 g/m².

b. roller lacquer, matt
 100 parts by weight of resin
 12 parts by weight of highly disperse silica
 60 parts by weight of 1,6-hexane diol diacrylate This matt lacquer, which has a flowout viscosity of 75 seconds from a DIN-4-cup, was rolled on to veneered chipboard both as undercoat and as top coat (intermediate hardening) in a thickness of 15 g/m² in each case.

c. roller screed, pigmented
 100 parts by weight of resin
 33 parts by weight of talcum
 33 parts by weight of heavy spar 37 parts by weight of chalk
 35 parts by weight of titanium dioxide(rutile)
 2.5 parts by weight of disperse silica
 4.5 parts by weight of 1,6-hexane diol diacrylate The screed was rolled on to chipboard in a thickness of approximately 150 g/m². a), b) and c) were then hardened under electron beams in an inert gas atmosphere. The accelerator voltage was 380 kV, the current intensity 50 mA and the rate of travel with one scanner 25 m/minute for a deflection of the electron beam of 120 cm. A total of 2 - 3 Mrad was required. Thereafter the coatings were non-tacky and hard.

EXAMPLE 22

50 parts by weight of the resin of Example 7 were mixed with 50 parts by weight of 1,6-hexane diol diacrylate, a viscosity of 0.7 Pa.s. being obtained. This resin was used as binder for the production of a casting lacquer, a roller lacquer and a roller screed for electron-beam hardening.

a. casting lacquer, pigmented, matt
 100 parts by weight of resin
 40 parts by weight of titanium dioxide (rutile type)
 18 parts by weight of highly disperse silica
 0.2 part by weight of polybutadiene oil (molecular weight approximately 3000)

2.5 parts by weight of polyphenyl methyl siloxane (1% in ethyl acetate as levelling agent)

85 parts by weight of 1,6-hexane diol diacrylate

This resin had a flowout viscosity of 35 seconds in a DIN4 cup and was cast on to screeded chipboard in a thickness of approximately 120 g/m².

b. roller lacquer, matt 100 parts by weight of resin 12 parts by weight of highly disperse silica 25 parts by weight of 1,6-hexane diol diacrylate This matt lacquer, which had a flowout viscosity of 60 seconds from a DIN 4 cup, was rolled onto chipboard both as undercoat and as topcoat (intermediate hardening) in a thickness of approximately 15 g/m² in each case.

c. roller screed, pigmented 100 parts by weight of resin 42 parts by weight of talcum 42 parts by weight of heavy spar 58.5 parts by weight of chalk 40 parts by weight of titanium dioxide (rutile)

3 parts by weight of disperse silica as matting agent 6 parts by weight of 1,6-hexane diol diacrylate The screed was rolled on to chipboard in a thickness of approximately 150 g/m². The hardening of a), b) and c) was carried out in the same way as in Example 21.

EXAMPLE 23

50 parts by weight of the resin according to Example 7 were mixed with 50 parts by weight of 1,6-hexane diol diacrylate, resulting in a viscosity of 0.7 Pa.s.

This resin was used as binder for the production of a casting lacquer which was hardened peroxidically under heat at a temperature of 150° C.

Casting lacquer, pigmented, matt 100 parts by weight of resin 40 parts by weight of titanium dioxide (rutile)

6 parts by weight of highly disperse silica 0.2 part by weight of polybutadiene oil (molecular weight about 3000)

2.5 parts by weight of polyphenyl methyl siloxane (1% in ethyl acetate as levelling agent)

5.0 parts by weight of cobalt octoate solution (2.2% of cobalt metal in toluene)

50 parts by weight of 1,6-hexane diol diacrylate

This lacquer had a flowout viscosity of 40 seconds from a DIN 4 cup and was applied to screeded chipboard in a thickness of 150 g/m². This chipboard had been precoated with a roller active primer consisting of 100 parts by weight of butyl acetate 3.0 parts by weight of nitrocellulose, standard type 4E, 65% in butyl acetate 12 parts by weight of a polyester based on phthalic acid anhydride, maleic acid anhydride and 1,2-propylene glycol, styrene-free, 75% in butyl acetate 48 parts by weight of cyclohexanone peroxide with 10% of water 17 parts by weight of cyclohexanone peroxide, 50% in dioctyl phthalate The lacquer was adjusted with butyl acetate to a viscosity corresponding to a flowout time of approximately 16.5 seconds from a DIN 4 cup. The lacquer was applied by means of a lacquering roller in a thickness of approximately 15 g/m², and was dry after about 0.5 minute at room temperature.

The cast lacquer was hardened over a period of 3 minutes in hot air at 150° C. A matt, scratchproof lacquer coating was obtained.

EXAMPLE 24

14.25 parts by weight of 1,6-hexane diol diacrylate, 47.5 parts by weight of 2-hydroxy propyl acrylate, 7.5 parts by weight of α-ethyl benzoin ethyl ether, 20 parts by weight of ethanol and 20 parts by weight of water were added to 80.75 parts by weight of the resin according to Example 7. The UV-light-hardening lacquer obtained had a viscosity corresponding to a flowout time of 20 seconds from a DIN-4-cup.

The lacquer was applied to paper and aluminium foil in a layer thickness of 15 μm by means of a hand coater. Hardening was carried out under a high pressure mercury vapour lamp of the Hanovia type, the distance of the lamp from the lacquered surface being 10 cm.

Glossy, solvent-resistant, scratchproof and firmly adhering lacquer coatings were obtained at a belt speed of 30 m/minute.

We claim:

1. A coating composition comprising as binder a reaction product of a polyepoxide with more than one 1,2-epoxide group per molecule, wherein its epoxide groups have been reacted
   a. with 0.01 to 0.5 NH-equivalents, based on one epoxide equivalent of ammonia or of an aliphatic or cycloaliphatic primary amine or of ε-aminocaproic acid or of a mixture of the aforementioned nitrogen compounds; and subsequently
   b. with 0.40 to 0.90 carboxyl equivalents, based on one epoxide equivalent, of acrylic acid or methacrylic acid or of a mixture of acrylic and methacrylic acid; and finally
   c. with 0.09 to 0.50 carboxyl equivalents, based on one epoxide group, of a saturated aliphatic, monocarboxylic acid, so that at least 80% of the epoxide groups originally present have been reacted through these three component stages.

2. A coating composition as claimed in claim 1, wherein the polyepoxide is a bisphenol-A-polyglycidyl ether.

* * * * *